(12) United States Patent
Liu

(10) Patent No.: US 7,516,926 B2
(45) Date of Patent: Apr. 14, 2009

(54) SUCTION DISC UNIT

(75) Inventor: Su-Wei Liu, Taipei (TW)

(73) Assignee: Comart Corporation, Taipei (TW)

( * ) Notice: Subject to any disclaimer, the term of this patent is extended or adjusted under 35 U.S.C. 154(b) by 54 days.

(21) Appl. No.: 11/453,817

(22) Filed: Jun. 16, 2006

(65) Prior Publication Data

US 2007/0290105 A1 Dec. 20, 2007

(51) Int. Cl.
*A45D 42/14* (2006.01)
(52) U.S. Cl. .............. 248/205.5; 248/206.2; 248/309.3; 248/363
(58) Field of Classification Search .............. 248/205.5, 248/205.6, 205.7, 205.8, 683, 363, 206.1, 248/206.2, 309.3
See application file for complete search history.

(56) References Cited

U.S. PATENT DOCUMENTS

| | | | | |
|---|---|---|---|---|
| 6,234,435 B1 * | 5/2001 | Yeh | ........................ | 248/205.5 |
| 6,308,923 B1 * | 10/2001 | Howard | .................. | 248/205.5 |
| 6,550,735 B1 * | 4/2003 | Zheng | ........................ | 248/304 |
| 6,749,160 B1 * | 6/2004 | Richter | .................... | 248/206.2 |
| 7,007,908 B2 * | 3/2006 | Tsay | ........................ | 248/309.3 |
| 7,066,434 B2 * | 6/2006 | Kwok | ........................ | 248/205.8 |
| 7,293,750 B2 * | 11/2007 | Richter | .................... | 248/205.5 |
| 2007/0262217 A1 * | 11/2007 | Wang et al. | .............. | 248/205.5 |

* cited by examiner

*Primary Examiner*—J. Allen Shriver
*Assistant Examiner*—Todd M. Epps
(74) *Attorney, Agent, or Firm*—Bacon & Thomas, PLLC

(57) ABSTRACT

A suction disc unit, especially a suction disc unit that can be adsorbed on a smooth surface to support a hung article, it comprises a pressing lid, a suction disc, a link and a pressing rod; wherein the pressing rod at least has a first eccentric protruding portion and a second eccentric protruding portion; when the pressing lid is pulled up to make abutment of the suction disc against the smooth surface by pushing of the pressing rod, the air in the gap between the suction disc and the smooth surface is removed as much as it can; when the pressing rod is pressed down, the pressing lid abuts against the periphery of the suction disc, and the central portion of the suction disc is pulled up tight, the air pressure in the gap is much lower than that of the atmosphere to thereby induce a strong suction force, and thereby to increase the bearing strength of the suction disc unit.

4 Claims, 4 Drawing Sheets

SUCTION DISC UNIT

BACKGROUND OF THE INVENTION

1. Field of the Invention

The present invention is related to a suction disc unit that can be adsorbed on a smooth surface to support a hung article, and especially to an improved design of suction disc for increasing adsorbing force and thus increasing supporting force.

2. Description of the Prior Art

A suction disc unit mainly is used to be adsorbed on a plain surface to support a hung article. Taking the U.S. Pat. Nos. 6,234,435 and 6,749,160 as examples, wherein a suction disc unit can be adsorbed on a piece of glass of a car, the suction disc unit is provided with a supporting rod and a receiving seat etc. to support a PDA or GPS etc. And as is stated in the U.S. Pat. No. 6,550,735, hanging hooks are provided on a suction disc unit, thereby a suction disc can be adsorbed on a smooth surface such as a piece of tile or glass to hang at will thereon an article of daily necessities such as a tower, a suit of clothes etc.

The above stated conventional suction disc units generally each includes thereon a pressing lid forming in its inner side a receiving space, a suction disc provided in the inner side of the pressing lid, a link provided centrally on the suction disc and a pressing rod provided in the outside of the pressing lid; the pressing lid has an eccentric protruding portion; when the suction disc abuts against the smooth surface to press down the pressing lid, the eccentric protruding portion abuts against the pressing lid, so that the pressing lid abuts against the periphery of the suction disc, and the link moves upwards to pull tight the central portion of the suction disc, hence a gap that has been in an air tight state between the suction disc and the smooth surface expands, thus the air originally in the gap presents a state of low pressure by expansion of the air, now the air pressure in the gap is much lower than that of the atmosphere to thereby induce a strong suction force.

The bearing strength of the suction disc unit is influenced by the pressure difference between the abovementioned air in the gap and the pressure of the atmosphere in the circumstance, the larger the pressure difference is, the larger the bearing strength will be; in other words, the smaller the pressure difference is, the smaller the bearing strength of the suction disc unit will be. While the ways of lowering the air pressure in the gap have two kinds; one is to remove the air in the gap, the other is to expand the gap in case the amount of air is limited (in an air tight state).

In the above stated two U.S. Pat. Nos. 6,234,435 and 6,749, 160, we can see that the mode of designing of the prior arts in increasing the bearing strength of a suction disc unit mainly takes advantage of a spring abutting on a suction disc to help removing of the air in a gap.

Therefore, when the suction disc unit is in suction, a user sticks the suction disc unit to a smooth surface, by abutting of the spring on the suction disc, the air in the gap between the suction disc and the smooth surface is removed as much as it can, in order that the suction disc unit can have larger bearing strength during subsequent expanding of the gap.

The prior arts using a spring to remove air is worth being taken for reference, however, they still have the problems such as being cumbersome in assembling and having elastic fatigue, the pushing force of each of the springs is inadequate, the distance of pushing will be reduced by such elastic fatigue . . . etc.

SUMMARY OF THE INVENTION

In view of the above problems resided in the prior arts, the inventor of the present invention provides a suction disc unit of which the suction effect is increased.

The suction disc unit comprises: a pressing lid having in its inner side a receiving space; a suction disc provided in the inner side of the pressing lid; a link provided centrally on the suction disc, the link is extended through the pressing lid to the outside; and a pressing rod provided in the outside of the pressing lid, the pressing rod has a pressing end and a pivotally connecting end; the pivotally connecting end is pivotally connected to the link, and at least has a first eccentric protruding portion; when the suction disc abuts against a smooth surface to press down the pressing rod, the first eccentric protruding portion abuts against the pressing lid, so that the pressing lid abuts against the periphery of the suction disc, and the link moves upwards to pull tight the central portion of the suction disc, hence a gap that is in an air tight state between the suction disc and the smooth surface expands, thus the air in the gap presents a state of low pressure much lower than that of the atmosphere to thereby induce a strong suction force. The present invention is characterized in that:

The pivotally connecting end at least has a second eccentric protruding portion, the pressing lid at least has thereon a stopper at where the second eccentric protruding portion is; when the pressing end of the pressing rod is pulled up, the second eccentric protruding portion abuts against the stopper to move down the pressing rod, thereby when the suction disc abuts against the smooth surface, it is not pressed by the pressing lid but adequately sticks to the smooth surface, this is favorable to removal of air.

Thereby, when a user pulls up the pressing lid to make abutment of the suction disc against the smooth surface, the air in the gap between the suction disc and the smooth surface is removed as much as it can, in order that the residual air in the gap is reduced. When the user once more presses down the pressing rod, the pressing lid abuts downwards against the periphery of the suction disc, and the central portion of the suction disc is pulled up tight, the gap in an air tight state expands.

The present invention will be apparent in its technical measures and the preferred ways of practicing after reading the detailed description of the preferred embodiment thereof in reference to the accompanying drawings.

DETAILED DESCRIPTION OF THE PREFERRED EMBODIMENT

Figure 1:
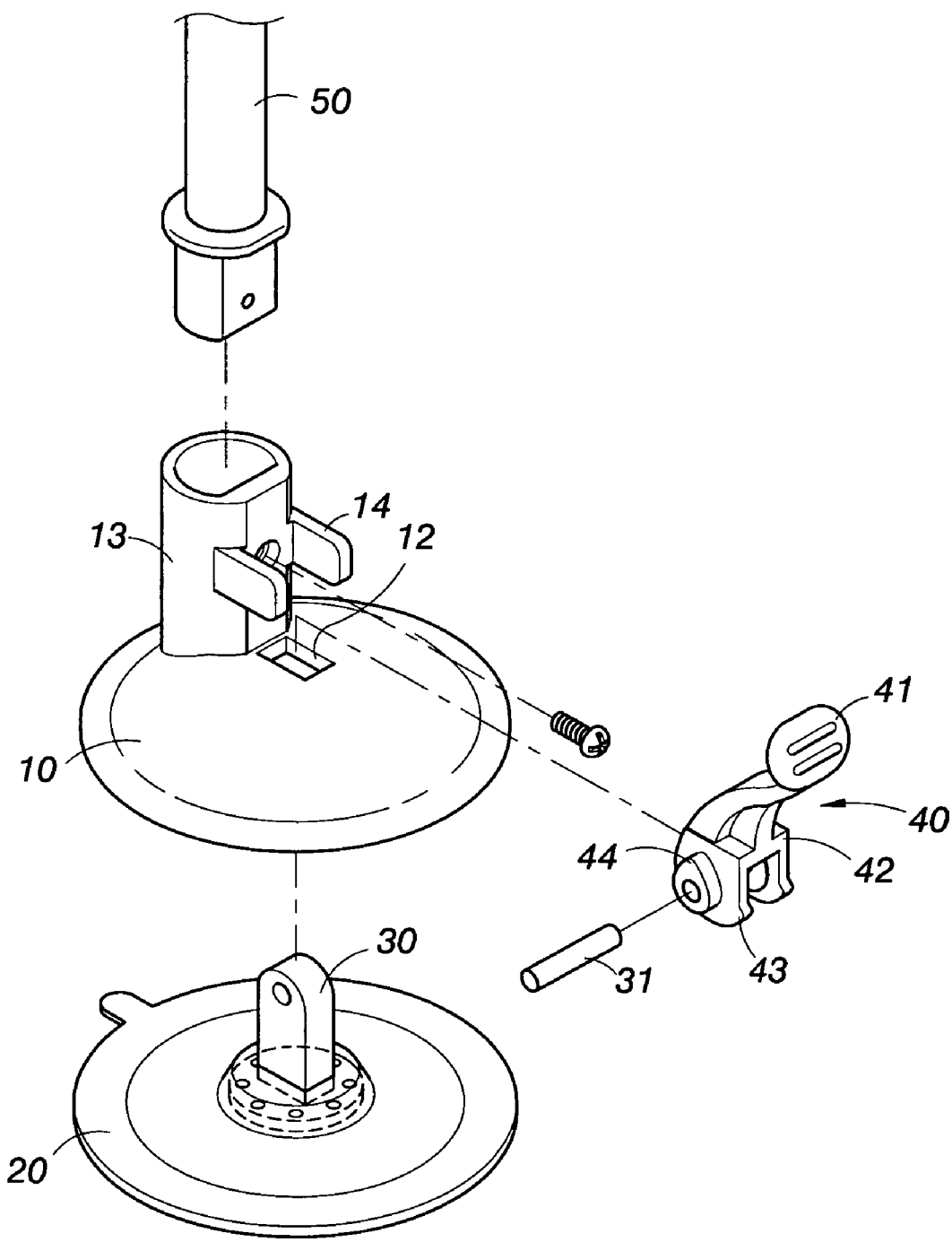
FIG. 1 is an anatomic perspective view of the first embodiment of the present invention.
Figure 2:
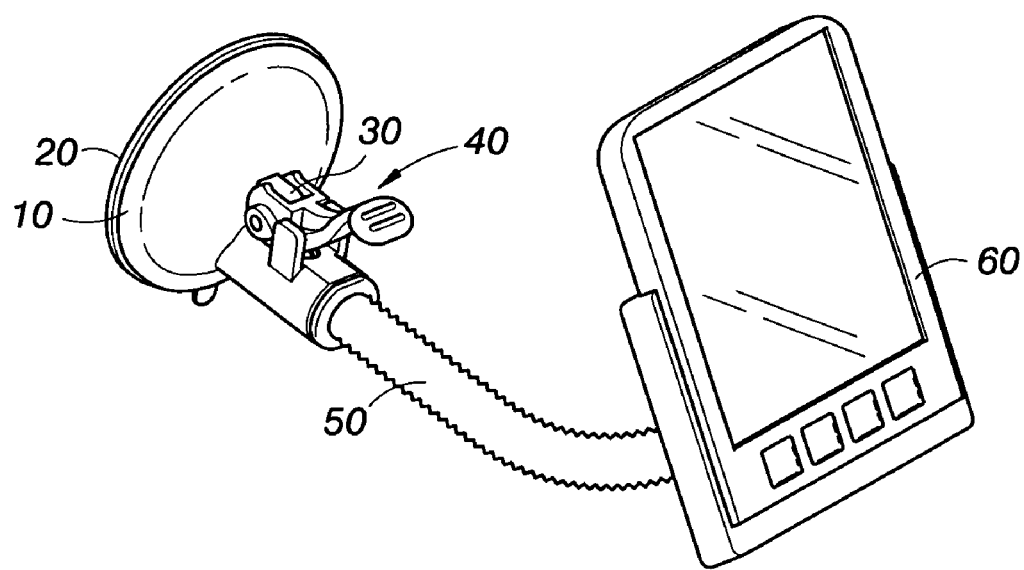
FIG. 2 is a perspective view of the first embodiment of the present invention after assembling.

Referring firstly to FIGS. 1 and 2 which are respectively perspective views before and after assembling of the first embodiment of the present invention; wherein the suction disc unit of the present invention comprises the main members including a pressing lid 10, a suction disc 20, a link 30 and a pressing rod 40; and a connecting member 50 is provided for mounting an article 60 such as a PDA, a GPS, a mobile phone, an A/V equipment or some other instrument, meter etc.

Figure 3:
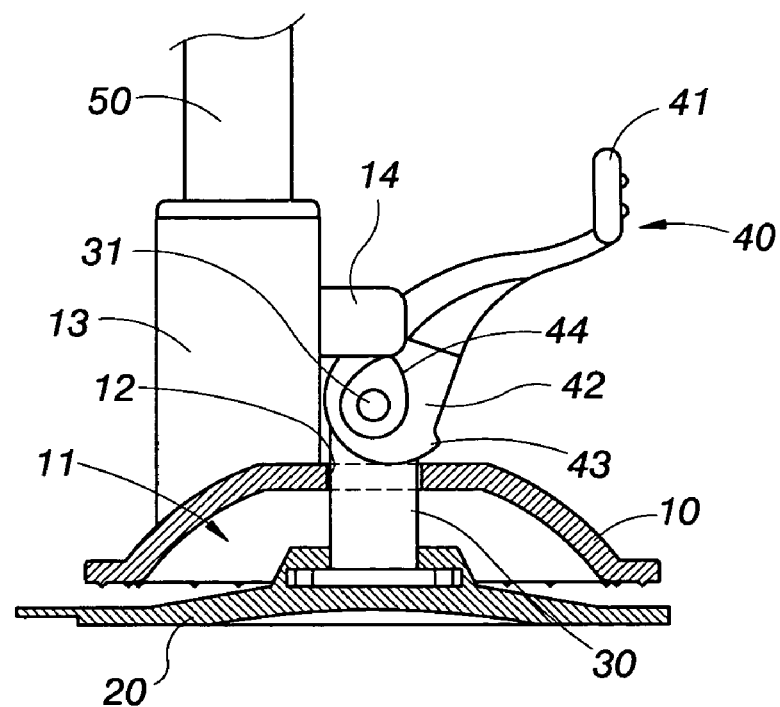
FIG. 3 is a sectional schematic view of the first embodiment of the present invention.

Referring simultaneously to FIGS. 1 and 3, wherein FIG. 3 is a sectional schematic view of the first embodiment of the present invention; the pressing lid 10 has in its inner side a receiving space 11, the pressing lid 10 is provided centrally thereof with a hole 12 and is provided on its outer side with a connecting seat 13, the connecting seat 13 is provided thereon at least with a protruding stopper 14 that can be integrally formed with the connecting seat 13; the connecting seat 13 is used for positioning the connecting member 50.

The suction disc 20 is made of soft plastic or some other material that can get an air tight effect together with a smooth surface; the suction disc 20 is provided in the inner side of the pressing lid 10; the link 30 is provided centrally on the suction disc 20, the top of the link 30 is extended through the hole 12 of the pressing lid 10 to the outside; and the suction disc 20 is integrally formed with the link 30.

The pressing rod 40 is provided in the outside of the pressing lid 10, the pressing rod 40 has a pressing end 41 and a pivotally connecting end 42; the pivotally connecting end 42 is pivotally connected to the link 30 via a rotational axle 31, so that the pivotally connecting end 42 pivots relative to the link 30 taking the rotational axle 31 as its center; the pressing rod 40 at least has a first eccentric protruding portion 43 and at least has a second eccentric protruding portion 44; in the drawing shown, the first eccentric protruding portion 43 and the second eccentric protruding portion 44 are respectively provided near by the pivotally connecting end 42, and the second eccentric protruding portion 44 is provided beneath the protruding stopper 14.

Figure 4:
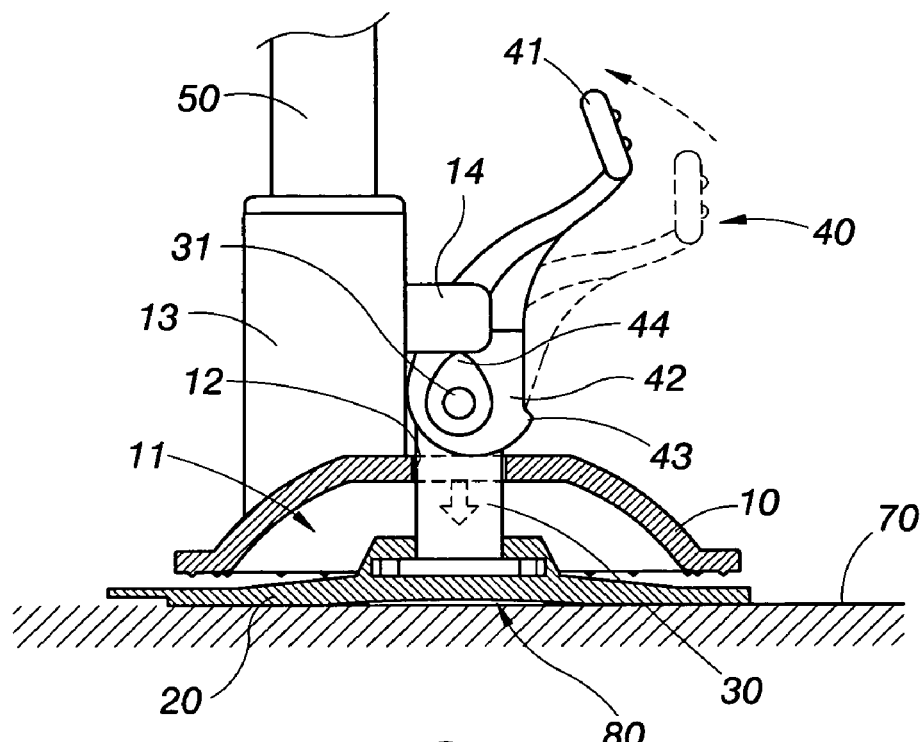
FIG. 4 is a sectional schematic view showing operation of the first embodiment of the present invention.

As shown in FIG. 4, when the suction disc 20 is abutted against a smooth surface 70, a gap 80 is formed between the suction disc 20 and the smooth surface 70; now if the pressing end 41 of the pressing rod 40 is in the state of being pulled up, the second eccentric protruding portion 44 abuts against a lower end of the stopper 14 to move down the link 30, at this time, a user can make adequate abutment of the suction disc 20 against the smooth surface 70 by pushing the suction disc 20; during the process of pushing, the suction disc 20 is not pressed by the pressing lid 10 and is hidden in the receiving space 11, hence the link 30 can have a pushing force directly acting on the central portion of the suction disc 20 to reduce the residual amount of air in the gap 80 as much as it can, even to make the gap 80 be reduced to an degree that the latter can not be seen with an eye.

Figure 5:
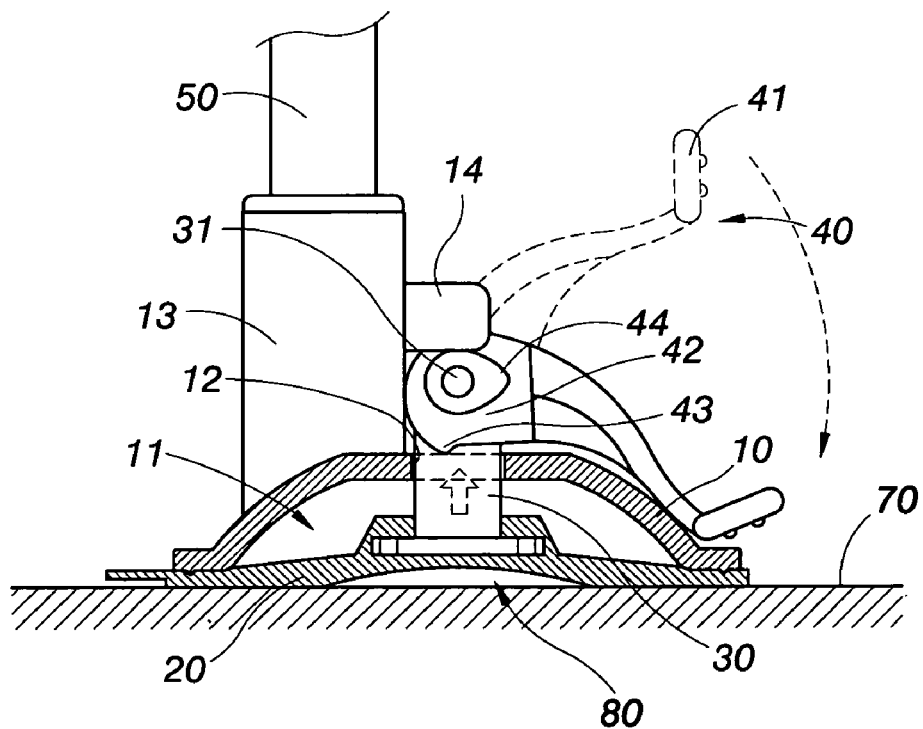
FIG. 5 is another sectional schematic view showing operation of the first embodiment of the present invention.

As shown in FIG. 5, when the action of the suction disc 20 disclosed in FIG. 4 is completed, the user can press down the pressing end 41 of the pressing rod 40, so that the first eccentric protruding portion 43 abuts downwards against the pressing lid 10, so that the pressing lid 10 abuts against to position the periphery of the suction disc 20, and the link 30 moves upwards to pull tight the central portion of the suction disc 20, hence the gap 80 that is in an air tight state between the suction disc 20 and the smooth surface 70 expands, thus the air pressure in the gap 80 presents a state of low pressure much lower than that of the atmosphere by such expansion; when the difference of the air pressure in the gap 80 from that of the atmosphere is sufficiently evident, a strong suction force can thereby be induced between the suction disc 20 and the smooth surface 70 to thereby increase the bearing strength of the suction disc unit.

Figure 6:
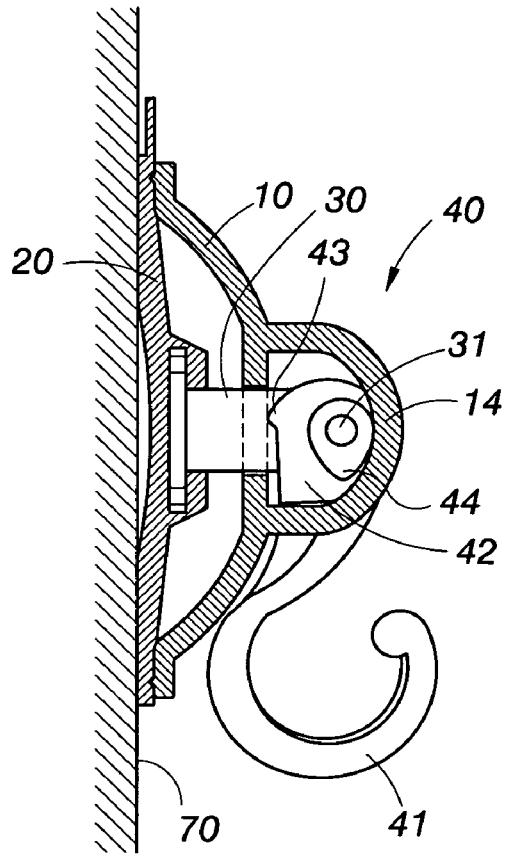
FIG. 6 is a sectional schematic view of a second embodiment of the present invention.

As shown in FIG. 6 which is a sectional schematic view of a second embodiment of the present invention, in this embodiment, the pressing end 41 is in the form of a hanging member such as a hook or a ring etc., so that the pressing end 41 can be used for hanging an article, while the stopper 14 can be fixed directly on or integrally formed with the pressing lid 10.

Figure 7:
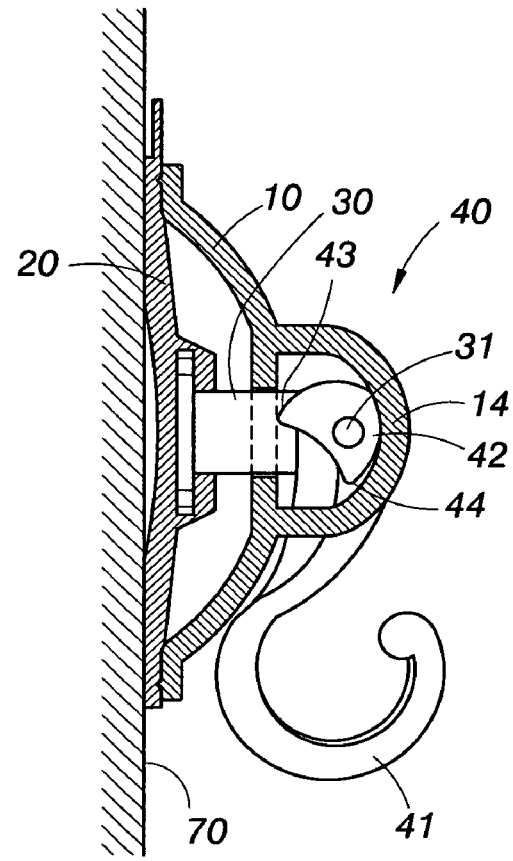
FIG. 7 is a sectional schematic view of a third embodiment of the present invention.

As shown in FIG. 7 which is a sectional schematic view of a third embodiment of the present invention, in this embodiment, the pivotally connecting end 42 is in the form of a twin cam, the first eccentric protruding portion 43 and the second eccentric protruding portion 44 are directly formed on the twin cam, thereby during the process of pivoting of the pressing rod 40, as is stated above, the first eccentric protruding portion 43 abuts downwards against the pressing lid 10, and the second eccentric protruding portion 44 abuts against the protruding stopper 14, by these two actions of alternate pushing by abutting, the action of suction is effected.

Effects

The present invention at least has the following advantages:

1. The present invention can effectively reduce the residual air in the gap between the suction disc and the smooth surface, so that when the gap between the suction disc and the smooth surface expands, the air pressure in the gap is much lower than that of the surrounding atmosphere, thereby the effect of suction of the suction disc is increased.
2. The present invention has a first eccentric protruding portion and a second eccentric protruding portion to alternately do the pushing actions to render the link connecting with the suction disc to get an effect of ascending and descending, this can overcome the problem of difficulty in assembling by having the springs in the conventional suction disc units.
3. The present invention overcomes the problem of elastic fatigue of the springs of the conventional suction disc units by having the second eccentric protruding portion that has superior pushing force from the spring in it.

The embodiment given is only for illustrating the present invention, and not for giving any limitation to the scope of the present invention. It will be apparent to those skilled in this art that various equivalent modifications or changes without departing from the spirit of this invention shall also fall within the scope of the appended claims.

The invention claimed is:

1. A suction disc unit for attaching a connecting member to a smooth surface, the unit comprising:
   a) a pressing lid having an inner side and an outer side, the inner side defining a receiving space and the outer side including a connecting seat protruding from a surface of the pressing lid for supporting the connecting member;
   b) a suction disc in the receiving space for engaging the smooth surface, the suction disc including a central link extending through and to the outside of the pressing lid;
   c) a stopper on the outer side of the pressing lid, the stopper being integrally formed with the connecting seat and including a lower end, wherein the stopper protrudes from an outer surface of the connecting seat at a position spaced from the pressing lid;
   d) the pressing lid further including a pressing rod having a pressing end and a connecting end, the connecting end being pivotally connected to the central link for permitting the pressing end to be pivoted between a first position and a second position;

e) the connecting end including a first eccentric portion and a second eccentric portion adjacent thereto, the second eccentric portion being disposed beneath the stopper for engaging the lower end thereof;

f) the first eccentric portion engaging the pressing lid against the suction disc and moving the central link away from the smooth surface for creating suction between the suction disc and the smooth surface when the pressing end is pivoted into the first position; and g) the second eccentric portion engaging the lower end of the stopper and moving the central link towards the smooth surface to release the pressing lid from the suction disc for reducing the amount of air between the suction disc and the smooth surface when the pressing end is pivoted into the second position.

2. The suction disc unit of claim 1, wherein the suction disc is integrally formed with the central link.

3. The suction unit of claim 1, wherein the pressing end is in the form of a hanging member.

4. The suction unit of claim 1, wherein the first and second eccentric portions are in the form of a twin cam.

* * * * *